United States Patent
Schmalz et al.

(10) Patent No.: US 7,915,350 B2
(45) Date of Patent: Mar. 29, 2011

(54) POLYOXYMETHYLENE COMPOSITIONS, THEIR PREPARATION AND USE

(75) Inventors: Holger Schmalz, Bayreuth (DE); Christine Köstler, Hattersheim (DE); Klaus Kurz, Kelsterbach (DE)

(73) Assignee: Ticona GmbH, Kelsterbach (DE)

( * ) Notice: Subject to any disclaimer, the term of this patent is extended or adjusted under 35 U.S.C. 154(b) by 295 days.

(21) Appl. No.: 11/402,687

(22) Filed: Apr. 12, 2006

(65) Prior Publication Data

US 2006/0235119 A1 Oct. 19, 2006

Related U.S. Application Data

(60) Provisional application No. 60/672,182, filed on Apr. 15, 2005.

(51) Int. Cl.
*C08G 18/48* (2006.01)

(52) U.S. Cl. ........ 525/398; 525/400; 525/123; 525/124; 525/154; 525/339; 525/401; 525/411; 525/441; 525/443

(58) Field of Classification Search .................... 525/441
See application file for complete search history.

(56) References Cited

U.S. PATENT DOCUMENTS

| | | | |
|---|---|---|---|
| 3,213,158 A | 10/1965 | Sakakibara et al. | |
| 3,364,157 A * | 1/1968 | Halek et al. | 525/54.22 |
| 3,670,050 A * | 6/1972 | Castner et al. | 525/399 |
| 3,892,821 A * | 7/1975 | Koleske et al. | 525/411 |
| 4,493,751 A | 1/1985 | Cherdron et al. | |
| 4,628,072 A * | 12/1986 | Shiraki et al. | 525/57 |
| 4,707,525 A * | 11/1987 | LaNieve et al. | 525/399 |
| 4,975,518 A * | 12/1990 | Broussard et al. | 528/230 |
| 4,975,519 A * | 12/1990 | Yang et al. | 528/230 |
| 5,004,798 A * | 4/1991 | Broussard et al. | 528/230 |
| 5,079,330 A * | 1/1992 | Makabe et al. | 528/87 |
| 6,444,777 B1 * | 9/2002 | Genz et al. | 528/60 |
| 6,512,047 B2 * | 1/2003 | Kim et al. | 525/66 |
| 6,930,145 B2 * | 8/2005 | Kudou et al. | 525/66 |
| 2004/0116575 A1 | 6/2004 | Flexman et al. | |

FOREIGN PATENT DOCUMENTS

| | | |
|---|---|---|
| DE | 2947490 | 6/1981 |
| DE | 0397492 | 11/1990 |
| EP | 0397493 | 11/1990 |
| EP | 0397494 | 11/1990 |
| EP | 0398585 | 11/1990 |
| EP | 0400827 | 12/1990 |
| WO | WO-2005/023898 | 3/2005 |

\* cited by examiner

*Primary Examiner* — Irina S Zemel

(74) *Attorney, Agent, or Firm* — Dority & Manning, P.A.

(57) ABSTRACT

Compositions are described comprising a) polyoxymethylene, b) thermoplastic elastomer having active hydrogen atoms, c) polyoxymethylene which differs from component a) and contains active hydrogen atoms, d) reagent for covalent coupling of components b) and c), and e) if appropriate, another impact modifier, which differs from component b).

The compositions feature improved toughness and can be used for production of moldings.

20 Claims, No Drawings

POLYOXYMETHYLENE COMPOSITIONS, THEIR PREPARATION AND USE

RELATED APPLICATIONS

This application claims benefit under 35 U.S.C. 119(e) to Ser. No. 60/672,182, filed Apr. 15, 2005.

The present invention relates to novel polyoxymethylene molding compositions, and also to their preparation and use, in particular as molding compositions for injection molding, blow molding, and extrusion for production of moldings of any type.

Polyoxymethylene (hereinafter also termed "POM") is a high-performance polymer with good mechanical properties, such as stiffness and strength. However, because POM has high polarity and crystallinity it is often incompatible with other polymers, or only partially compatible therewith. Furthermore, it is rarely possible to incorporate functional comonomers into POM.

There have been previous attempts to prepare graft polymers, associated with the use of functionalized POM.

By way of example, EP-A-397,492, EP-A-398,585 and EP-A-397,494 describe functionalized polyoxymethylenes which are prepared via copolymerization of trioxane and the formal of trimethylolpropane (ester), of trioxane and the α,α- and α,β-isomers of glycerol formal (ester), or of trioxane and the formal of 1,2,6-hexanetriol (ester).

EP-A-400,827 describes graft polymers which derive from functionalized POM and from polymers functionalized with amino groups. The functionalized POM has acrylate groups or acrylate ester groups, and the polymer functionalized with amino groups is bonded via Michael addition to the functionalized POM. These graft polymers are proposed inter alia for use as compatibilizers between POM and polymers which are similar to the polymer functionalized with amino groups. A disadvantage with these approaches is that the reaction is possible only in solution.

EP-A-397,493 discloses graft polymers which derive from POM functionalized with hydroxy groups, from diisocyanates, and from polymer functionalized with hydroxy, amino, or carboxy groups. The latter is bonded via diisocyanate coupling to the functionalized POM. These graft polymers are proposed inter alia for use as compatibilizers between POM and other suitable polymers. The document does not indicate reactive extrusion with in-situ preparation of a compatibilizer, or coupling of impact modifier to functionalized POM.

Another fact that has been known for a long time is that the impact resistance of POM can be influenced via use of impact modifiers. Examples of these are thermoplastic polyurethane elastomers (hereinafter also termed "TPE-U"), methyl methacrylate-butadiene-styrene core-shell elastomers, methyl methacrylate-acrylate core-shell elastomers, polycarbonate, styrene-acrylonitrile copolymers, or acrylate-styrene-acrylonitrile copolymer compounded materials.

Starting from this prior art, it is an object of the present invention to provide novel impact-modified POM compositions which feature a better combination of toughness, tensile strain at break, and weld line strength. The improvement in toughness can be observed via advantageous values for notched impact resistance and also for fracture energy.

Another object of the present invention is provision of a process which improves the compatibility of selected impact modifiers with the POM matrix, and which does not need to use solvents. Use of a compatibilizer formed in-situ, in the form of an impact modifier covalently linked to POM, can improve compatibility between POM phase and the impact-modifier phase. Use of the compatibilizer reduces the size of the impact-modifier phase and eases its dispersion in the POM matrix.

Yet another object of the present invention is provision of a process for preparation of POM molding compositions in which operations can use conventional apparatus, and which delivers POM molding compositions with excellent impact-modification.

The invention provides compositions comprising
a) polyoxymethylene,
b) thermoplastic elastomer having active hydrogen atoms,
c) polyoxymethylene which differs from component a) and contains active hydrogen atoms, preferably hydroxy groups,
d) reagent for covalent coupling of components b) and c), and
e) if appropriate, another impact modifier, which differs from component b).

Component a) of the inventive compositions is provided by oxymethylene homo- or copolymers.

The polyoxymethylenes (POM), as described by way of example in DE-A-29 47 490, are generally unbranched linear polymers which generally contain at least 80%, preferably at least 90%, of oxymethylene units ($-CH_2-O-$). The term polyoxymethylenes here encompasses both homopolymers of formaldehyde or of its cyclic oligomers, such as trioxane or tetroxane, and corresponding copolymers.

Homopolymers of formaldehyde or of trioxane are polymers whose hydroxy end groups have been chemically stabilized in a known manner with respect to degradation, e.g. via esterification or via etherification. Copolymers are polymers composed of formaldehyde or of its cyclic oligomers, in particular trioxane, and of cyclic ethers, of cyclic acetals, and/or of linear polyacetals.

These POM homo- or copolymers are known per se to the person skilled in the art and are described in the literature.

Very generally, these polymers have at least 50 mol % of $-CH_2-O-$ repeat units in the main polymer chain. The homopolymers are generally prepared via polymerization of formaldehyde or trioxane, preferably in the presence of suitable catalysts.

POM copolymers are preferred in the inventive compositions, particularly those which also contain, besides the $-CH_2-O-$ repeat units, up to 50 mol %, preferably from 0.1 to 20 mol %, and in particular from 0.5 to 10 mol %, of repeat units, where $R^1$ is a saturated or ethylenically unsaturated alkylene group having at least two carbon atoms, or a cycloalkylene group, which, if appropriate, has sulfur atoms or preferably oxygen atoms in the chain, and which, if appropriate, bears one or more substituents selected from the group consisting of alkyl, cycloalkyl, aryl, aralkyl, heteroaryl, halogen, or alkoxy.

$R^1$ is preferably a $C_2$-$C_4$-alkylene group which, if appropriate, has one or more substituents which are $C_1$-$C_4$-alkyl groups, or are $C_1$-$C_4$-alkoxy groups, and/or are halogen atoms, preferably chlorine atoms, or a group of the formula $-((C_nH_{2n})-O-)_m$, in which n is a whole number from 2 to 4 and m is 1 or 2.

These groups can advantageously be introduced into the copolymers via ring-opening of cyclic ethers and/or acetals.

Preferred cyclic ethers or acetals are those of the formula

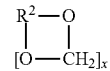

in which x is 0 or 1 and $R^2$ is a $C_2$-$C_4$-alkylene group which, if appropriate, has one or more substituents which are $C_1$-$C_4$-akyl groups, or are $C_1$-$C_4$-alkoxy groups, and/or are halogen atoms, preferably chlorine atoms.

Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers.

It is particularly advantageous to use copolymers composed of from 99.5 to 95 mol % of trioxane and of from 0.5 to 5 mol % of one of the above-mentioned comonomers.

Other polyoxymethylenes likewise suitable are oxymethylene terpolymers which by way of example are prepared via reaction of trioxane and of one of the cyclic ethers or acetals described above, and using a third monomer, preferably a bifunctional compound of the formula

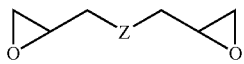

where Z is a chemical bond, —O—, or —O—$R^6$—O— ($R^6$=$C_2$-$C_8$-alkylene or $C_2$-$C_8$-cycloalkylene).

Preferred monomers of this type are ethylene diglycide, diglycidyl ether and diethers composed of glycidyl compounds and formaldehyde in a molar ratio of 2:1, and also diethers composed of 2 mol of glycidyl compound and 1 mol of an aliphatic diol having from 2 to 8 carbon atoms, examples being the diglycidyl ether of ethylene glycol, 1,4-butanediol, 1,3-butanediol, 1,3-cyclobutanediol, 1,2-propanediol, and 1,4-cyclohexanediol, and also diglycerol diformal, to mention just a few examples.

Processes for preparation of the POM homo- and copolymers described above are known to the person skilled in the art and are described in the literature.

The melting points of the preferred POM copolymers are at least 150° C., and their molecular weights (weight-average) $M_w$ are in the range from 5000 to 200 000, preferably from 7000 to 150 000.

End-group-stabilized POM polymers whose chain ends have carbon-carbon bonds, or which have methoxy end groups, are particularly preferred as component a).

The melt index (MVR value 190/2.16) of POM polymers used as component a) is generally from 2 to 50 $cm^3$/10 min (ISO 1133).

The inventive compositions comprise, as component b), thermoplastic elastomers which have active hydrogen atoms. These are thermoplastic elastomers which, under the selected processing conditions, are capable of forming covalent bonds with the active hydrogen atoms of component c) and with the coupling reagent used as component d).

Examples of thermoplastic elastomers are polyester elastomers (TPE-E), thermoplastic polyamide elastomers (TPE-A), and in particular thermoplastic polyurethane elastomers (TPE-U). These thermoplastic elastomers have active hydrogen atoms which can be reacted with the coupling reagent. Examples of these groups are urethane groups, amide groups, amino groups, or hydroxy groups, for example of terminal polyesterdiol soft segments of thermoplastic polyurethane elastomers, these having hydrogen atoms which by way of example can be consumed by reaction with isocyanate groups or with carbonic ester groups.

Component c) of the inventive compositions is a polyoxymethylene which differs from component a) and which contains active hydrogen atoms. This component can have terminal groups having active hydrogen atoms, e.g. amino groups or in particular hydroxy groups, for example hydroxyethylene groups, and/or the polyoxymethylene can have pendant groups having active hydrogen atoms, examples being amino groups or in particular hydroxy groups.

The polyoxymethylene radicals of component c) can be selected from the polyoxymethylene radicals described above in component a), but these have been functionalized with the terminal and/or pendant groups containing active hydrogen atoms.

The melt index (MVR value 190/2.16) of POM polymers used for preparation of component c) is generally from 2 to 70 $cm^3$/10 min (ISO 1133), preferably from 5 to 60 $cm^3$/10 min.

EP A-397,492, EP-A-398,585, and EP-A-397-494 give examples of hydroxy-functionalized polyoxymethylenes.

It is preferable to use hydroxy-functionalized polyoxymethylenes which derive from copolymers of trioxane with the formal of trimethylol propane, of trioxane with the α,α- and α,β-isomers of glycerol formal, or of trioxane with the formal of 1,2,6-hexanetriol.

Other components c) whose use is preferred are polyoxymethylene homo- or copolymers having terminal hydroxyalkylene groups, preferably hydroxyethylene groups. WO-A-2005/023,898 gives examples of these polymers.

To form the bridging group between components b) and c), it is possible to use a very wide variety of polyfunctional, preferably tri- or in particular bifunctional, coupling reagents which firstly can form covalent bonds with the active hydrogen atoms of component c) and secondly can form covalent bonds with the active hydrogen atoms of component b).

Component d) is preferably a diisocyanate, more preferably an aliphatic, cycloaliphatic, and/or aromatic diisocyanate.

Component d) can also be used in the form of oligomers, preferably tri- or in particular dimers, if appropriate in a mixture with a polymer. Examples of this are mixtures of dimeric diisocyanates in polylactones.

Examples of diisocyanates are aromatic diisocyanates, such as tolylene diisocyanate, naphthylene diisocyanates, diphenylmethane 2,4'-diisocyanate, or 4,4'-diisocyanatodiphenylmethane; or (cyclo)aliphatic diisocyanates, such as hexamethylene diisocyanate or isophorone diisocyanate.

Another preferred group of the coupling reagents d) is selected from an activated diester or an activated diamide. For the purposes of this description, an activated diester or activated diamide means those diesters or diamides which, under processing conditions for the inventive molding composition, are capable of forming covalent bonds with the thermoplastic elastomers b) and with the polyoxymethylene c) containing groups having active hydrogen atoms. These are in particular derivatives of carbonic acid, such as esters of carbonic acid, or activated urea derivatives, or esters or half-esters of dicarboxylic acids, or dianhydrides of tetracarboxylic acids.

In selecting the coupling reagents d) care has to be taken that these are at least to some extent soluble in the mixture to be reacted under processing conditions or reaction conditions, and are therefore available for a coupling reaction. For the purposes of this description, "sufficiently soluble" means solubility of at least 1 mg/kg.

Preference is given to diesters of aromatic or of aliphatic dicarboxylic acids or in particular diesters of carbonic acid, very particularly preferably diaryl ester.

A preferred example of a diaryl ester of carbonic acid is diphenyl carbonate.

Preference is likewise given to diesters of oxalic acid, in particular the diphenyl ester or the dimethyl ester.

Preferred examples of diesters or aromatic dicarboxylic acids are diphenyl esters or dimethyl esters of isophthalic acid or of terephthalic acid.

Preferred examples of diesters of aliphatic dicarboxylic acids are diphenyl esters or dimethyl esters of adipic acid or of sebacic acid.

A preferred example of a dianhydride of tetracarboxylic acids is oxybis(phthalic anhydride).

A preferred example of an activated urea derivative is N,N'-carbonyl biscaprolactamate or carbonyldiimidazole.

Particularly preferred components b) used are thermoplastic polyester elastomers (TPE-E), thermoplastic polyamide elastomers (TPEA), thermoplastic polyurethane elastomers (TPEU), or a combination of two or more of these thermoplastic elastomers.

If appropriate, the inventive composition also comprises, besides component b), another impact modifier, which differs from component b), an example being core-shell impact modifiers. These components are known to the person skilled in the art.

Preference is likewise given to compositions comprising, as component c), hydroxy-functionalized polyoxymethylenes which derive from copolymers of trioxane with the formal of trimethylolpropane, of trioxane with the α,α- and α,β-isomers of glycerol formal, or of trioxane with the formal of 1,2,6-hexanetriol, or whose component c) is polyoxymethylene homo- or copolymers having terminal hydroxyalkylene groups, preferably hydroxyethylene groups.

The amount of component a) in the inventive compositions is usually from 40 to 98% by weight, preferably from 70 to 96% by weight.

The amount of component b) in the inventive compositions is usually from 1 to 50% by weight, preferably from 4 to 30% by weight.

The amount of component c) in the inventive compositions is usually from 0.1 to 20% by weight, preferably from 1 to 10% by weight.

The amount of component e) in the inventive compositions is usually from 0 to 50% by weight.

These stated amounts given above are based on the entirety of components a), b), c), d), and, if appropriate, e).

The invention also provides a process for preparation of the compositions defined above.

The process encompasses the measures of:
i) using, as initial charge, polyoxymethylene (component a),
ii) using, as initial charge, thermoplastic elastomer having active hydrogen atoms (component b),
iii) using, as initial charge, polyoxymethylene which contains active hydrogen atoms and which differs from polyoxymethylene used in step i) (component c),
iv) using, as initial charge, multifunctional coupling reagent which reacts both with the active hydrogen atoms of the polyoxymethylene and with the active hydrogen atoms of the thermoplastic elastomer and can form covalent bonds (component d),
v) if appropriate, using, as initial charge, another impact modifier which differs from the thermoplastic elastomer used in step ii) (component e),
vi) mixing of the reactive components b), c), and d), and, if appropriate, of the non-reactive components a) and/or e),
vii) heating of the composition in order to bring about the covalent coupling of the reactive components b), c), and d), and
viii) if appropriate, mixing of the reaction product obtained in step vii) with component a) and/or e).

The reaction of the reactive components b), c), and d) can take place separately from the addition of component a) and, if appropriate, e). It is also possible for preparation of the reaction product composed of components b), c), and d) to take place in two or more steps, for example via reaction of component c) and d) followed by reaction of the reaction product with component b).

It is preferable that all of the components of the composition are mixed with one another and then reacted in the melt, for example in an extruder.

In another preferred embodiment, a portion of the components of the composition is introduced into an extruder and further components or mixtures of two or more further components of the composition are introduced downstream into the extruder, and are added to the existing melt in the extruder.

In order to accelerate the coupling reaction, the components can be heated in the presence of a catalyst for the coupling reaction. This is usually a Lewis acid or a Lewis base.

Catalysts whose use is preferred for non-diisocyanate coupling reagents are the alkali metal or alkaline earth metal salts of acetylacetonates, in particular lithium acetylacetonate or sodium acetylacetonate, and/or alkali metal alcoholates, in particular sodium methanolate or lithium methanolate, and/or lithium halides, in particular lithium chloride, or tertiary amines, in particular trialkylamines, or cyclic tertiary amines, such as diazabicyclo[2.2.2]octane (DABCO), dimethylaminopyridine (DMAP), guanidine, or morpholine, or organotin compounds, preferably dibutyltin dilaurate, dibutyltin bis(2-ethylhexanoate), dibutyltin dibutyrate, dibutyltin dimethoxide, dibutyltin dioctanoate, or stannous ethylhexanoate.

The same catalysts can be used for multifunctional isocyanate coupling reagents in principle, but preference is given to tertiary amines or organotin compounds, for reasons of reduced tendency toward discoloration of the molding compositions.

The components are typically reacted at temperatures of from 100 to 240° C., preferably from 150 to 220° C., and the reaction time is typically from 0.5 to 60 minutes.

The content of multifunctional coupling reagent can be selected within wide limits. The amount of coupling reagent selected is preferably such that for every mole of hydroxy groups of the hydroxy-functionalized polyoxymethylene there are from 0.2 to 2.0 mol, preferably from 0.5 to 2.0 mol, of the polyfunctional coupling reagent.

The amounts of the catalysts used in the invention are from 0.1 ppm to 10 000 ppm, in particular from 1 ppm to 1000 ppm, based on the mixture to be reacted.

Examples of suitable Lewis acid catalysts are $LiX$, $Sb_2O_3$, $GeO_2$, $BX_3$, $MgX_2$, $BiX_3$, $SnX_4$, $SbX_5$, $FeX_3$, $GeX_4$, $GaX_3$, $HgX_2$, $ZnX_2$, $AlX_3$, $PX_3$, $TiX_4$, $MnX_2$, $ZrX_4$, $[R^4N]^+_q A^{q-}$, $[R^4P]^+_q A^{q-}$ where X can be a halogen atom, i.e. I, Br, Cl, or F, and/or a group —O—R or —R, where R is alkyl, cycloalkyl, aryl, or aralkyl, q is a whole number from 1 to 3, and A is a q-valent anion, such as halide, sulfate, or carboxylate, or else sulfonium salts or titanyl compounds.

Examples of suitable Lewis base catalysts are metal salts of carboxylic acids, preferably the alkali metal and alkaline earth metal salts, in particular the lithium salts, such as lithium versatate; or complexes of metals with acetylacetone, preferably the alkali metal and alkaline earth metal complexes, in particular lithium acetylacetonate; or alcoholates or phenolates of metals, preferably of alkali metals or of alkaline earth metals; or tertiary amines, in particular trialkylamines, or cyclic tertiary amines, such as diazabicyclo[2.2.2]octane (DABCO), dimethylaminopyridine (DMAP), guanidine, or morpholine, or organotin compounds, such as dibutyltin dilaurate, dibutyltin bis(2-ethylhexanoate), dibutyltin dibutyrate, dibutyltin dimethoxide, dibutyltin dioctanoate, or stannous ethylhexanoate.

It is also possible to use mixtures of various catalysts.

The components described above can be reacted in any desired reactors, for example in stirred tanks, in static mixers, or in particular in extruders or in kneaders.

To this end, the components, if appropriate together with the respective catalyst, are introduced into the reactor individually or in the form of a mixture of two or more components, and are reacted with one another, if appropriate in a stream of gas and/or in vacuo.

Treatment in a stream of gas and/or in vacuo accelerates the reaction, and the reaction times become correspondingly shorter. This is particularly observed when using active esters or amides as coupling reagents, because these reactions produce low-molecular-weight cleavage products which are dissipated via the treatment, shifting the equilibrium in the desired direction.

Gases that can be used are any of the gases which do not degrade, or do not significantly degrade, the reaction mixture. Examples of these are air or preferably inert gases, such as nitrogen or noble gases.

The reaction temperatures are typically above 60° C., preferably from 100 to 240° C., in particular from 150 to 220° C.

The reaction time is typically from 0.5 to 60 minutes.

In one embodiment of the inventive process, the reaction takes place via mixing of at least three of components b), c), and d), and, if appropriate, of components a) and e), of the catalyst, and, if appropriate, of other additives, and via thermal treatment of the mixture, if appropriate in a stream of gas and/or in vacuo, for a period sufficient to achieve the desired degree of conversion of components b), c), and d). The temperatures selected here are such that the reaction mixture is liquid or that a liquid phase forms in the reaction mixture.

A feature of the inventive compositions when compared with compositions comprising merely components a) and b), and, if appropriate, e), but not comprising the reaction product of components b), c), and d), is better dispersion of the phase of the thermoplastic elastomers in the POM matrix. The action of the reaction product of components b), c), and d) here is that of a compatibilizers between components a) and b), leading to formation of smaller particles composed of thermoplastic elastomers. This is discernible via considerably improved toughness and tensile strain at break of the moldings produced from the inventive molding compositions.

The inventive compositions can comprise other additives known per se, which can be added before the preparation of the compositions is complete, or thereafter.

Examples of additives are processing aids, such as antioxidants, acid scavengers, formaldehyde scavengers, UV stabilizers, heat stabilizers, adhesion promoters, lubricants, nucleating agents, or mold-release agents, fillers, reinforcing materials, or antistatic agents; or additions which give the molding composition a desired property, such as dyes and/or pigments, and/or additions rendering materials electrically conductive; and also mixtures of these additions, but without restriction of scope to the examples mentioned.

The inventive compositions can be processed via mixing of the fine-particle, for example pulverulent or granulated, components and then processing by thermoplastic methods, or via mixing of the components in heatable mixing assemblies suitable for this purpose. Examples of suitable mixing assemblies and suitable mixing processes are described in: Saechtling, Kunststoff-Taschenbuch [Plastics handbook], Hanser Verlag, 27th edition 1998, on pages 202-217, expressly incorporated herein by way of reference.

The inventive compositions can be used for moldings of any type, in particular for production of fibers, of foils, of hoses, of pipes, of bars, or of profiles.

Possible methods of processing the inventive compositions are blow molding, rotomolding, injection molding, or extrusion.

The inventive compositions are particularly preferably used for production of loudspeaker grilles.

The invention therefore also provides the use of the compositions for the abovementioned purposes.

The examples below illustrate the invention but do not restrict it. Amounts stated here are always in parts by weight unless otherwise stated.

The studies carried out were based on the following mixing specification:

Component a): (100−(b+c+d+0.35)) % by weight of POM powder (3.4% by weight of dioxolane), MVR (190° C., 2.16 kg)=9.0 cm$^3$/10 min, Component b): 18% by weight of Elastollan B 85 A10 granules (Elastogran)

Component c): POM powder having terminal OH groups (POM-OH), 81 mmol/kg of OH groups, MVR (190° C., 2.16 kg) =51.4 cm$^3$/10 min, or POM having pendant OH groups (POM-(OH)$_x$), 270 mmol/kg of OH groups MVR (190° C., 2.16 kg)=11.0 cm$^3$/10 min, see table 1 for respective concentrations Component d): Tolylene diisocyanate dimer (TDI dimer), 25% strength by weight concentrate in poly(ε-caprolactone), ground granules (Retsch ZM 1 laboratory mill), the amount of TDI used being equimolar, based on the total concentration of OH groups in POM. See table 1 for respective concentrations Stabilizer system: 0.2% by weight of Irganox 1010 (Ciba), 0.15% by weight of Licowachs C (Clariant)

All of the components were first dried in a Binder vacuum oven at about 70° C., and they were then mixed in a Diosna R 10 A mixer from Dirk und Söhne. A Berstorff ZE 25 extruder was used for the compounding process (zone temperature 190° C., melt temperature about 210° C.). The screw configuration with kneading elements was selected so as to give effective mixing of the components during the reactive extrusion process.

The following standards were used for testing of the resultant compounded materials:

MVR (190° C., 2.16 kg): ISO 1133
Elongation test: ISO 527-1/-2
Charpy notched impact resistance: ISO 179-1/1 eA
Electronic penetration test (fracture energy): ISO 6603-2

The tables below collate the experiments carried out and the characterization of the compounded materials.

TABLE 1

MVR and mechanical properties of compounded materials

| Example | TDI concentrate [% by wt.] | POM-OH [% by wt.] | MVR (190° C., 2.16 kg) [cm$^3$/10 min] | E [MPa] | $\sigma_{br}$ [MPa] | $\epsilon_{br}$ [%] |
|---|---|---|---|---|---|---|
| 1 | 0 | 0 | 5.9 | 1650 | 36.4 | 66.4 |
| 2 | 0.82 | 0 | 5.7 | 1584 | 35.7 | 87.5 |
| 3 | 1.06 | 0 | 5.5 | 1606 | 37.0 | 94.3 |
| 4 | 1.47 | 0 | 5.6 | 1575 | — | — |
| 5 | 0 | 5 | 6.2 | 1641 | 36.7 | 80.9 |
| 6 | 0 | 10 | 6.4 | 1623 | 36.3 | 84.7 |
| 7 | 0.82 | 5 | 6.5 | 1514 | 37.8 | 126.1 |
| 8 | 1.06 | 10 | 6.3 | 1599 | 37.4 | 99.4 |
|  |  | POM-(OH)$_x$ [% by wt.] |  |  |  |  |
| 9 | 0 | 1 | 6.0 | 1648 | — | — |
| 10 | 0 | 2 | 6.2 | 1666 | — | — |
| 11 | 0 | 5 | 6.3 | 1654 | — | — |
| 12 | 0.75 | 1 | 5.8 | 1623 | — | — |
| 13 | 0.93 | 2 | 6.0 | 1634 | — | — |
| 14 | 1.47 | 5 | 5.8 | 1623 | — | — |

E = modulus of elasticity,
$\sigma_{br}$ = tensile stress at break,
$\epsilon_{br}$ = tensile strain at break Sole addition of TDI (Table 1, examples 2-4) leads to a slight reduction in the MVR value and to increased tensile strain at break in comparison with the standard compounded material without components c) and d) (example 1). This can be attributed to crosslinking of the TPU phase via the TDI.

The slight increase in the MVR value via addition of OH-functionalized POM (examples 5, 6, 9-11) can be explained via the higher MVR value of the POM-OH and POM-(OH)$_x$ used. Here again, a slight increase in tensile strain at break can be observed.

Only the combination of TDI and OH-functionalized POM led to a significant increase in tensile strain at break. This can particularly be observed with the compounded material with 0.82% of TDI concentrate and 5% of POM-OH, its tensile strain at break being 126%.

The effect of TDI and, respectively, OH-functionalized POM on strength properties (modulus of elasticity) can in general be disregarded, i.e. no significant loss of strength in comparison with the standard compounded material (example 1). Only in example 7 (0.82% of TDI concentrate, 5% of POM-OH) could a slight fall-off in modulus of elasticity be observed.

TABLE 2

Comparison of toughness properties of compounded materials prepared

| Example | TDI concentrate [% by wt.] | | $a_{CN}$, 23° C. [kJ/m$^2$] | $a_{CN}$, −30° C. [kJ/m$^2$] | $W_D$, 23° C. 2 mm sheet [J] | $W_D$, −30° C. 2 mm sheet [J] |
|---|---|---|---|---|---|---|
| | | POM-OH [% by wt.] | | | | |
| 1 | 0 | 0 | 17.3 | 9.6 | 11.0 | 12.4 |
| 2 | 0.82 | 0 | 19.2 | 9.3 | 13.1 | 8.9 |
| 3 | 1.06 | 0 | 19.4 | 10.2 | 17.1 | 11.2 |
| 4 | 1.47 | 0 | 19.5 | 10.7 | 18.8 | 8.3 |
| 5 | 0 | 5 | 17.1 | 9.0 | 20.2 | 15.5 |
| 6 | 0 | 10 | 17.0 | 9.2 | 19.8 | 23.4 |
| 7 | 0.82 | 5 | 22.7 | 11.3 | 19.6 | 16.7 |
| 8 | 1.06 | 10 | 20.9 | 10.9 | 18.8 | 12.9 |
| | | POM-(OH)$_x$ [% by wt.] | | | | |
| 9 | 0 | 1 | 18.1 | 10.1 | 18.6 | 21.7 |
| 10 | 0 | 2 | 17.1 | 8.9 | 20.0 | 21.5 |
| 11 | 0 | 5 | 18.5 | 9.1 | 26.1 | 19.8 |
| 12 | 0.75 | 1 | 21.4 | 10.5 | 19.0 | 13.3 |
| 13 | 0.93 | 2 | 19.2 | 9.6 | 18.5 | 19.9 |
| 14 | 1.47 | 5 | 21.7 | 10.4 | 19.0 | 15.4 |

$a_{CN}$ = Charpy notched impact resistance,
$W_D$ = fracture energy

Sole use of TDI (Table 2, examples 2-4) led to very slightly increased notched impact resistances ($a_{CN}$) and fracture energies ($W_D$) in comparison with the standard compounded material without components c) and d) (example 1).

The use of OH-functionalized POM alone (examples 5, 6, 9-11) led only to a significant increase in fracture energy. The best results, i.e. significant improvement in $a_{CN}$ and $W_D$ in comparison with the standard compounded material (example 1), were obtained via a combination of TDI and OH-functionalized POM (examples 7, 8, 12-14). A marked improvement in toughness properties at low temperatures was also observed, and this is particularly reflected in the values for fracture energy at −30° C.

The experiments carried out clearly show that in-situ formation of POM-TPU copolymers (compatibilizers between POM phase and TPU phase), produced via coupling of OH-functionalized POM onto the TPU phase by means of diisocyanate, is essential for improvement of toughness properties ($a_{CN}$+$W_D$) and fracture curve (significantly increased tensile strain at break), without any attendant adverse effect on strength properties (modulus of elasticity unchanged).

The invention claimed is:
1. A composition comprising a mixture of:
i) a) a first polyoxymethylene homo- or copolymer, the first polyoxymethylene homo- or copolymer consisting essentially of
at least 50 mol % of —CH$_2$—O— repeat units,
up to 50 mol % of —O—R$^1$- repeat units, where R$^1$ is a saturated or ethylenically unsaturated alkylene group having at least two carbon atoms, or a cycloalkylene group, optionally, the residual of a monomer of the formula

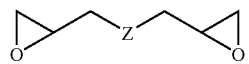

where Z is a chemical bond, —O—, or O—R$^6$—O(R$^6$ = C$_2$-C$_8$-alkylene or C$_2$-C$_8$-cycloalkylene), and optionally, the first polyoxymethylene homo- or copolymer is an end-group-stabilized polyoxymethylene, and
ii) a reaction product comprising:
b) a thermoplastic elastomer having active hydrogen atoms, wherein the thermoplastic elastomer is selected from the group consisting of thermoplastic polyester elastomers (TPE-E), thermoplastic polyamide elastomers (TPE-A), thermoplastic polyurethane elastomers (TPE-U), and combinations thereof and
c) a second polyoxymethylene which differs from component a) and contains active hydrogen atoms, wherein the thermoplastic elastomer and the second polyoxymethylene are covalently coupled by a coupling reagent d), wherein component d) comprises one or more compounds selected from the group consisting of diisocyanates, activated diesters, activated diamides, carbonyl biscaprolactamate, and mixtures thereof, and
iii) e) optionally an impact modifier, which differs from component b); wherein component b), component c), component d) and optionally component e) are dispersed in component a).
2. The composition as claimed in claim 1, wherein component c) is a hydroxyfunctionalized polyoxymethylene which derives from copolymers of trioxane with the formal of trimethylolpropane, of trioxane with the α,α- and α,β-isomers of glycerol formal, or of trioxane with the formal of 1,2,6-hexanetriol.
3. The composition as claimed in claim 1, wherein component c) is a polyoxymethylene homo- or copolymer having terminal hydroxyalkylene groups.

4. The composition as claimed in claim 1, wherein component b) is a thermoplastic polyurethane elastomer (TPE-U).

5. The composition as claimed in claim 4, which comprises, as component c), hydroxy-functionalized polyoxymethylenes which derive from copolymers of trioxane with the formal of trimethylolpropane, of trioxane with the α,α- and α,β-isomers of glycerol formal, or of trioxane with the formal of 1,2,6-hexanetriol, or whose component c) is polyoxymethylene homo- or copolymers having terminal hydroxyalkylene groups.

6. The composition as claimed in claim 1, wherein the amount of component a) is from 40 to 98% by weight, the amount of component b) is from 1 to 50% by weight, and the amount of component c) is from 0.1 to 20% by weight, the stated amounts being based on the entirety of components a), b), c), d), and optionally e).

7. A process for preparation of the compositions as claimed in claim 1, encompassing the following measures:
   i) using, as initial charge, the first polyoxymethylene (component a),
   ii) using, as initial charge, the thermoplastic elastomer having active hydrogen atoms (component b),
   iii) using, as initial charge, the second polyoxymethylene (component c),
   iv) using, as initial charge, the coupling reagent (component d),
   v) optionally using, as initial charge, the impact modifier (component e),
   vi) mixing of the reactive components b), c), and d), and optionally of the nonreactive components a) and/or e),
   vii) heating of the composition in order to bring about the covalent coupling of the reactive components b), c), and d), and
   viii) optionally mixing of the reaction product obtained in step vii) with component a) and/or e).

8. The process as claimed in claim 7, wherein the heating takes place in the presence of a catalyst which is a Lewis acid or a Lewis base.

9. The process as claimed in claim 8, wherein the catalyst used comprises the alkali metal or alkaline earth metal salts of acetylacetonates, alkali metal alcoholates, lithium halides, tertiary amines, or cyclic tertiary amines, organotin compounds, or stannous ethylhexanoate.

10. The process as claimed in claim 9, wherein the composition is heated to temperatures of from 100 to 240° C. and wherein the reaction time is from 0.5 to 60 minutes.

11. The process as claimed in claim 7, wherein the content of multifunctional coupling reagent is selected in such a way that for every mole of hydroxy groups of the hydroxy-functionalized polyoxymethylene there are from 0.2 to 2.0 mol, of the polyfunctional coupling reagent.

12. The process as claimed in claim 7, wherein the temperatures to which heating takes place are such that the reaction mixture is liquid or that a liquid phase forms in the reaction mixture.

13. The composition as claimed in claim 1, wherein component d) comprises one or more compounds selected from the group consisting of an activated diester, an activated diphenyl carbonate, an activated diphenyl terephthalate, an activated carbonyldiimidazole, a carbonyl biscaprolactamate, and mixtures thereof.

14. The process as claimed in claim 8, wherein the catalyst used comprises lithium acetylacetanate, sodium acetylacetonate, sodium methanolate, lithium methanolate, lithium chloride, trialkylamines, diazabicyclo[2,2,2]octane (DABCO), dimethylaminopyridine (DMAP), guanidine, morpholine, dibutyltin dilaurate, dibutyltin bis(2-ethylhexanoate), dibutyltin dibutyrate, dibutyltin dimethoxide, dibutyltin dioctanoate, or stannous ethylhexanoate and
   wherein the composition is heated to temperatures of from 150 to 220° C. and wherein the reaction time is from 0.5 to 60 minutes and
   wherein the content of multifunctional coupling reagent is selected in such a way that for every mole of hydroxy groups of the hydroxy-functionalized polyoxymethylene there are from 0.5 to 2.0 mol, of the polyfunctional coupling reagent.

15. A method comprising: (i) providing a composition according to claim 1; and (ii) molding the composition to form a molded article.

16. The method according to claim 15, wherein the molded article comprises a loud speaker grill.

17. The method according to claim 15, wherein the molded article comprises one or more articles selected from the group consisting of fibers, foils, hoses, pipes, bars and profiles.

18. The method according to claim 15, wherein molding the composition comprises one or more selected from the group consisting of blow molding, rotomolding, injection molding, and extrusion.

19. A composition comprising a mixture of:
   i) a) a first polyoxymethylene, and
   ii) a reaction product comprising:
      b) a thermoplastic elastomer having active hydrogen atoms, and
      c) a second polyoxymethylene which differs from component a) and contains active hydrogen atoms wherein the second polyoxymethylene comprises a homo- or copolymer having terminal hydroxyalkylene groups,
      wherein the thermoplastic elastomer and the second polyoxymethylene are covalentiy coupled by a coupling reagent d), wherein component d) comprises one or more compounds selected from the group consisting of, activated diesters, activated diamides, carbonyl biscaprolactamate, and mixtures thereof and
   iii) e) optionally another impact modifier, which differs from component b); wherein component b), component c), component d) and optionally component e) are dispersed in component a).

20. A process for preparing a composition, the process comprising:
   i) providing
      a) a first polyoxymethylene,
      b) a thermoplastic elastomer having active hydrogen atoms, and
      c) a second polyoxymethylene which differs from component a) and contains active hydrogen atoms,
      d) a covalent coupling reagent comprising one or more compounds selected from the group consisting of, activated diesters, activated diamides, carbonyl biscaprolactamate, and mixtures thereof;
   ii) introducing a first portion of one or more of components a, b, c and d or a mixture thereof into an extruder at a first introduction point such that a melt of the first portion is formed in the extruder;
   iii) introducing a second portion of one or more of components a, b, c and d or a mixture thereof into the extruder at a second introduction point downstream from the first introduction point such that the second portion is mixed with the melt; and
   iv) reacting components b, c and d in the extruder to form a reaction product comprising the themoplastic elastomer covalently coupled to the second polyoxymethylene, wherein the reaction product is present in a mixture with the first polyoxymethylene.

* * * * *